Patented July 18, 1950

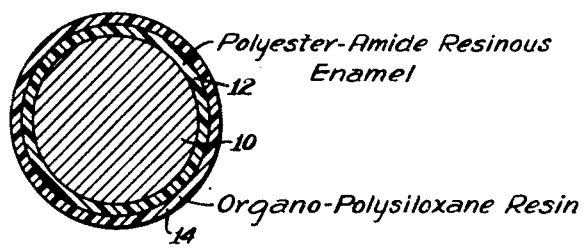
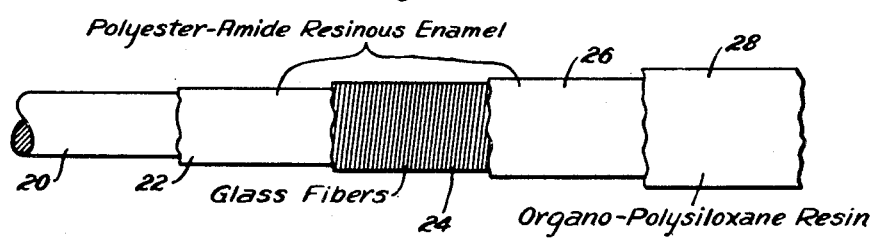

2,516,030

UNITED STATES PATENT OFFICE 2,516,030

INSULATED WIRE SUITABLE FOR HIGH-TEMPERATURE APPLICATIONS

Jack Swiss, McKeesport, Pa., assignor to Westinghouse Electric Corporation, East Pittsburgh, Pa., a corporation of Pennsylvania Application June 19, 1947, Serial No. 755,614

8 Claims. (Cl. 174—120)

This invention relates to insulated conductors and more particularly enameled wire having properties rendering it suitable for high temperature applications.

Wire carrying conventional organic enamels known to the prior art has not been suitable for continuous use at temperatures much above 105° C. since the enamels tend to decompose, carbonize and otherwise deteriorate rapidly at temperature of, say 125° C. and higher. The various electrical societies (N. E. M. A. and A. I. E. E.) have set up standards for conventional organic insulation recommending that insulation composed of entirely organic resins or products be not employed continuously at temperatures of over 105° C.

Organo-polysiloxane resins have been available to the art for a number of years. While many attempts have been made to apply organo-polysiloxane resins to wire in the form of enameled coatings, these resins have been found to be far inferior to oleoresinous and synthetic all-organic resin enamels. So far, any organopolysiloxane resin sufficiently flexible so that enameled wire made therewith could be wound into coils has been then found to be so thermoplastic that coils built therewith shorted at temperature of about 100° C. Therefore, no insulated conductors are available carrying organo-polysiloxane resin enamel alone that can be used commercially for coils and related general uses at elevated temperature of over 100° C.

It has been found that certain cross-linked polyester-amide resins possess a degree of resistance to thermal decomposition not known with other organic wire enamel resins. In the Charles B. Leape patent application, Serial No. 657,554, filed March 27, 1946, now Patent No. 2,495,172, there is described a synthetic organic polyester-amide wire enamel which has been found to possess astonishing thermal endurance. Coils made from wire carrying the enamel of that patent application have been tested for prolonged periods of time at temperature of 150° C. to 200° C., without substantial thermal decomposition of the resin. For comparison numerous other commercially known enamels applied to copper wire when tested in parallel with the enamels disclosed in application Serial No. 657,554 have failed due to decomposition, embrittlement and in other ways so that they were not usuable after only a short time at temperatures of 150° C. and higher. Coils wound with wire coated with the best conventional commercial organic enamels when maintained at temperatures of from 140° to 200° C. averaged from 35 to 53 hours before failing, whereas coils wound with wire carrying the enamel of application Serial No. 657,554 had not shorted after hundreds of hours at 200° C. These tests have indicated the completely unexpected thermal resistance of the cross-linked polyester-amide resins as disclosed by Charles B. Leape.

However, the cross-linked polyester-amide enamels have been found to be subject to oxidation at temperatures of 150° C. and higher as the main and apparently sole deteriorating phenomena. Prevention of oxidation at elevated temperatures has been found to enable the cross-linked polyester-amide resins in the form of enamel on wire to withstand severe elevated temperature conditions without any significant loss in physical or electrical insulating properties.

The object of the present invention is to provide an insulated conductor carrying a cross-linked polyester-amide resin enamel and a superposed coating of an organo-polysiloxane resin.

A further object of the invention is to provide an insulated conductor suitable for indefinite use at elevated temperatures, the insulation comprising a highly thermally stable, cross-linked polyester-amide resin enamel and an oxidation retarding superposed coating of organo-polysiloxane resin.

A still further object of the invention is to provide a method of insulating an electrical conductor with coatings of a plurality of resinous enamels to produce a product superior to that securable with any of the resins alone.

Other objects of the invention will in part be obvious and will in part appear hereinafter. For a better understanding of the nature and objects of the invention, reference should be had to the following detailed description and drawing, in which:

Figure 1 is a greatly enlarged cross section through a conductor insulated in accordance with the invention; and Fig. 2 is a schematic view of a conductor illustrating a modified form of the invention.

In accordance with the invention, a conductor, for example, wire composed of copper, silver or other metal or other conducting material, in wire, bar, strand, braid or other form, is coated initially with a layer of a substantially isotropic, cross-linked polyesteramide resin. Referring to Fig. 1 of the drawing, there is illustrated the conductor 10 insulated with a coating 12 of the cured cross-linked polyester-amide resinous enamel directly applied to the copper. Thereafter, a coating 14 of an organo-polysiloxane resin is superimposed over the polyester-amide coating 12. The coating 12 may be applied by dipping the wire one or more times in a resinous solution of the polyester-amide resin and baking after each dip to cure the resin. Thereafter, the partly coated conductor is dipped in an organo-polysiloxane resin one or more times and baked to cure the organo-polysiloxane resin. The coatings may be applied by means of dies, extrusion and the like. The following example is indicative of one mode of preparation of a conductor such as shown in Fig. 1.

EXAMPLE I

No. 25 (A. W. G.) wire was passed six times through a pan containing a 20% solution of a polyesteramide resin dissolved in a mixture of cresol, ethanol and a petroleum hydrocarbon consisting mainly of aromatics and having a distillation range of from 135° C. to 180° C. The wire was passed through an oven at a temperature of 450° C. in approximately 20 seconds. After six passes, the coating was 0.00075 inch thick. The time and temperature were not sufficient to fully cure the polyester-amide resin. The subsequent treatment with organo-polysiloxane resin was conducted at such a high temperature that the polyester-amide resin fully cured during that phase of the treatment.

The wire coated with the polyester-amide resin was dipped into a solution of a methyl phenyl siloxane resin containing from 1.2 to 1.5 organic groups per silicon atom, the methyl and phenyl groups being approximately equal in number. The siloxane resin was dissolved in a petroleum hydrocarbon consisting mainly of aromatics having a boiling range of approximately 135° C. to 180° C. The tower temperature was 450° C., and each portion of the wire was exposed to this temperature for approximately 40 seconds. Six passes in the organo-siloxane resin increased the total thickness of the enamel on the wire to 0.0015 inch; the wire diameter increased by 0.003 inch.

EXAMPLE II

The polyester-amide resin in Example I was composed of the reaction product of

| | Moles |
|---|---|
| Maleic anhydride | 5.34 |
| Succinic acid | 1.33 |
| Adipic acid | 1.33 |
| Ethylene glycol | 5.60 |
| Ethylene diamine | 2.40 |

The above ingredients were reacted by placing the first four ingredients in a reaction vessel equipped with a thermometer, stirring means, gas inlet tube, an outlet tube for removing water liberated during the reaction, and a dropping funnel. After the four ingredients had been stirred into a uniform mixture, the ethylene diamine was added to the solution slowly from the dropping funnel with rapid stirring. The rate of addition of the ethylene diamine was so adjusted that approximately ten minutes were required to add it to the reaction vessel contents. An exothermic reaction occurred during the addition of the ethylene diamine which caused the temperature to rise to from 100° C. to 115° C. After the addition of ethylene diamine was completed, the reaction vessel was heated externally so that the temperature rose slowly. At about 130° C., water vapor was given off and was swept out by a flow of nitrogen gas admitted to the interior of the reaction vessel through the gas inlet tube. The heat input was so adjusted that, after approximately two to eight hours, a temperature of 150° C. was reached. Good results are secured if a period of six hours is taken to reach 150° C. The rate of rise of temperature was maintained at this rate, or even at a somewhat slower rate, until the reaction product reached a maximum temperature of about 170° C. to 175° C. At this point, the A. S. T. M. ball and ring temperature of the resinous reaction product was from 45° C. to 90° C. The reaction was then terminated by diluting the resinous reaction product with a solvent in an amount sufficient to produce a composition having about 50% to 60% resin solids. The relatively concentrated resin solution was then cooled rapidly to room temperature. It was then diluted to a 20% solution by adding a solvent composed of approximately equal parts ethanol, cresol and the petroleum hydrocarbon.

Tests were made of the No. 25 wire prepared as in Example I and compared with wire coated with only polyester-amide resin corresponding to the polyester-amide described in Example II. Coils were wound with each type of insulated wire using two sets of parallel wires in winding the coil. One wire in each coil was connected to a source of direct current at 67 volts to cause sufficient current to flow to maintain a copper temperature of 235° C. and both wires were connected to a 22 volt measuring circuit to determine the change of resistance between the parallel sets of wire. Failure was taken at the time when the insulation resistance between the parallel wires fell below 1000 ohms. The following test data were obtained:

*Table*

| Wire | Average Life At 235°C., Hours |
|---|---|
| Polyester-amide resin alone | 82. |
| Wire of Example I | Greater than 1610.[1] |

[1] The test was discontinued at this point, insulation still excellent. Bare wire coated with the above organo-polysiloxane resin and made into coils shorted immediately a temperature above 100° C. was reached.

The cross-linked poly-ester-amide resins suitable for application to conductors in accordance with this invention may be produced by reacting (A) a mixture of organic dicarboxylic acids or anhydrides thereof having an average of from 2 to 3½ non-carboxyl carbon atoms per molecule, the mixture composed of from 48 to 92 mole per cent of an acid having the group

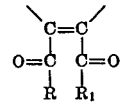

where R and R₁ each represent OH or R and R₁ together represent O, and the remainder is saturated aliphatic dicarboxylic acids having from 4 to 12 carbon atoms, and (B) a mixture of primary aliphatic amines and alkyl polyhydric alcohols, the total number of amino and hydroxyl groups in (B) substantially equal to or more than the total number of carboxyl groups in (A).

As described in application Serial No. 657,554, compositions of suitable polyester-amide resins are secured by reacting the following components. The unsaturated dicarboxylic acid or anhydride thereof is selected from the group consisting of maleic acid, fumaric acid, maleic anhydride and the monomethyl substitution derivatives for the non-carboxyl hydrogens thereof. Citraconic acid and citraconic anhydride are examples of such monomethyl derivatives. In combination with the unsaturated dibasic acid is a lesser molar amount of saturated aliphatic dicarboxylic acid, selected from dicarboxylic acids having from 1 to 12 non-carboxyl carbon atoms, and including at least 25 mole-percent of succinic acid. Reacted with the combination of dicarboxylic acids are a diamine selected from the group consisting of ethylene diamine and propylene diamine, and a polyhydric alcohol, the major proportion of which is a glycol. Suitable polyhydric alcohols are ethylene glycol, propylene glycol, diethylene glycol, hexamethylene glycol, glycerol and pentaerythritol.

In producing the resin, the unsaturated dicarboxylic acid and saturated dicarboxylic acid in an amount totaling from 7.2 to 8.8 moles are reacted with the aliphatic diamine and polyhydric alcohol totaling the same number of moles or with a molar excess of up to as much as a third more.

More specifically, exceptionally good synthetic resins are prepared from about 4.25 to 5.9 moles of the unsaturated dicarboxylic acid or anhydride thereof, such as maleic anhydride, and from 2 to 4.8 moles of a saturated dicarboxylic acid of which at least 25 mole-percent is succinic acid. Good results have been obtained with only succinic acid as the saturated dicarboxylic acid. From 2.1 to 2.65 moles of either ethylene diamine or propylene diamine or a mixture of both is combined with from 5 to 6.75 moles of a glycol or a mixture of polyhydric alcohols of which the major proportion is a glycol.

A class of polyester-amide resins may be prepared from the following ingredients in the proportions indicated:

|  | Component | Mole, percent |
|---|---|---|
| Acids: | Maleic acid, fumaric acid or maleic anhydride. | 38–47 |
|  | Adipic acid | 13– 4 |
| Amines and Alcohols: | glycerol (each mole glycerol may be replaced entirely or in part by ¾ mole of pentaerythritol). | 10–20 |
|  | Monoethanolamine (up to ½ of the monoethanolamine may be replaced by ½ mole ethylene diamine and ⅓ mole of glycerol). | 37–27 |

Examples of polyester-amide compositions this latter class having good thermal resistance properties are prepared by reacting the following:

EXAMPLE III

| Resin # | Moles | Compound |
|---|---|---|
| 1 | 3.89 | Maleic Anhydride. |
|  | 1.107 | Adipic Acid. |
|  | 1.166 | Glycerol. |
|  | 3.25 | Monoethanolamine. |
| 2 | 4.00 | Maleic Anhydride. |
|  | 1.00 | Adipic Acid. |
|  | 1.435 | Glycerol. |
|  | 2.438 | Monoethanolamine. |
|  | 0.406 | Ethylene Diamine. |
| 3 | 3.89 | Maleic Anhydride. |
|  | 1.11 | Adipic Acid. |
|  | 1.435 | Glycerol. |
|  | 2.438 | Monoethanolamine. |
|  | 0.406 | Ethylene Diamine. |
| 4 | 3.89 | Maleic Anhydride. |
|  | 0.553 | Adipic Acid. |
|  | 0.554 | Fumaric Acid. |
|  | 1.333 | Glycerol. |
|  | 3.00 | Monoethanolamine. |

The ingredients of each resin in Example III are reacted in the same manner as disclosed for the reaction under Example II.

In some instances, the combined enamels of the present invention may be associated with inorganic fibrous materials. Particularly suitable inorganic fibers are glass fibers and asbestos fibers. For minimum thinness of insulation, a single wrapping of continuous filament glass fibers has been found to be desirable. Referring to Fig. 2 of the drawing, there is illustrated this modification of the invention. The conductor 20 is coated with the polyester-amide resinous enamel to provide a layer 22 which is preferably uncured but partly dried so that the resin is tacky. Thereafter the glass fibers are wrapped as a layer 24 over the resinous enamel. Thereafter the wrapped conductor is passed into the polyester-amide resinous ester enamel and baked under the conditions set forth in Example I, that is, 450° C. for approximately 20 seconds. Three or four dips and bakes are ordinarily sufficient. This provides a cured coating 26 of cross-linked polyester-amide resinous enamel completely enveloping the continuous filament glass fibers. The glass fibers therefore are thoroughly bound to the conductor and completely coated. Thereafter the conductor is passed through the organopolysiloxane resin solution which after heat treatment to cure the polysiloxane resin produces the coating 28.

The total thickness of the insulation applied as in Fig. 2 may be varied to meet desired requirements. Thicknesses of as low as 2½ mils may be secured. However, heavier insulation may be desired in some cases. The insulation of Fig. 2 will have the high thermal resistance of the insulation of Fig. 1 with the advantages imparted by the presence of fibrous re-enforcing materials.

Organo-polysiloxane resins suitable for the outermost coating to prevent undesirable oxidation of the underlying cross-linked polyester-amide resins comprise the following typical structures:

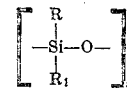

where R and R₁ may be the same or different organic radicals attached through carbon silicon linkages to at least some of the silicone atoms. The ratio of total R and R₁ to Si may vary from 2 to 1. $x$ may have a value of 4 or more. Suitable organic radicals represented by R and R₁ are aliphatic radicals, such for example as methyl, ethyl, propyl, isopropyl, butyl, amyl, heptyl to octadecyl and higher; aryl, alkaryl and aralkyl radicals, such as phenyl, tolyl, xylyl, mesityl, naphthyl, benzyl; and alkenyl radicals such as allyl, methallyl and the like. Where the condensation is incomplete R may represent a proportion of OH. It will be appreciated that the above are only exemplary and not exhaustive. Thus phenyl ethyl polysiloxane, allyl phenyl polysiloxane, methallyl methyl polysiloxanes, methyl polysiloxanes and similar siloxanes alone or mixtures thereof may be employed.

The polysiloxanes may form linear, branched, cross-linked and cyclic structures, usually combinations of all types are present in a single commercial batch of the polysiloxane. A typical cyclic structure is:

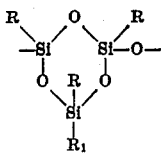

where R and R₁ are organic radicals as defined above. The terminal or end groups of any linear or branched structure may be as follows:

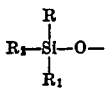

where R and R₁ are as defined above and R₂ may be an aliphatic, alkenyl, aryl, alkoxy, aryloxy or hydroxy radical.

The organo siloxanes may be prepared in various ways from such base materials as, for example, silicon tetrachloride, ethyl silicate or methyl silicon chlorides, by replacing halogen or ethoxyl radicals with any other desired organic radical.

Grignard reagent may be employed to replace halide or ethoxyl radical with organic groups, such as methyl, phenyl, allyl or the like, in any desired amount. At least one radical per silicon atom should be a readily hydrolyzable radical, as for example ethoxyl or halogen. Hydrolysis of the organosilicon compounds will produce silanols which will condense into polymers by elimination of water between hydroxyl groups to form silicon-oxygen-silicon linkages. Use of heat and dehydration or condensation catalysts such as sulphuric acid or organic borates will enable polymers of suitable molecular weight to be secured. If desired distillation or other fractionating processes may be employed to separate the polymers into predetermined molecular weight fractions. However solvent soluble, intermediate or incompletely condensed polysiloxanes are prepared and employed for coating wire, the polysiloxanes being heat convertible to an insoluble state.

The preparation and application of elastomeric organo-polysiloxanes over the layer of crosslinked polyester amide is a contemplated feature of the invention. Particularly good elastomeric organo-polysiloxanes are prepared from fluid dimethyl silicones by treating them by reflux with metallic halide catalysts such as ferric chloride or aluminum chloride until a gum is formed, and then admixing a large amount of a finely divided, inert inorganic solid filler such as titanium dioxide or lithopone, and from 1 to 5% of organic peroxide such as benzoyl peroxide. The composition may be milled and then extruded upon the conductor carrying a coating of cross-linked polyester-oxide resin, and the conductor heat treated for a few minutes at a temperature of from 150° C. to 250° C. to cure the elastomeric polysiloxane composition. By varying the proportion of benzoyl peroxide and filler the degree of hardness and firmness of the cured elastomer can be appropriately varied. The siloxane elastomers should be so applied to the conductors as to thoroughly cover the underlying layer of polyester-amide resin.

The siloxanes in the form of low polymers or incompletely condensed intermediates may be readily dissolved in toluene or other aromatic solvents and employed as enamels. In order to expedite curing and to complete condensation, a catalyst may be employed such for example as borates, for instance ethyl borate, phosphates, organic peroxides, for instance benzoyl peroxide, and metallic driers, as for instance lead naphthenate and cobalt linoleate. The presence of these catalysts or driers will enable rapid curing of the organo-siloxane low or intermediate polymers into a hard resinous coating in a short period of time at moderate temperatures.

It may be desirable to incorporate stabilizers in the organo-polysiloxanes in order to enable them to withstand high temperatures for prolonged periods without cracking or otherwise deteriorating unduly. High boiling point amines and phenols have been found to be particularly suitable for this purpose. Examples are p-aminophenol, diphenylamine, alpha-naphthylamine, alpha-naphthol and catechol.

Unusually good thermal stability has been imparted to organo-polysiloxanes by incorporating therein from 0.01% to 5% by weight of a metal chelate such for example as the copper ethyl acetoacetate and chromium acetylacetonate. The metal chelates are the reaction products of metal or metal compound with a compound having the formula

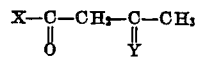

where X represents hydrocarbon, alkoxy, and hydrocarbon substituted amino radicals and Y represents oxygen, and hydrocarbon substituted imino radicals, the hydrocarbon substituted imino radical being present only when X is a hydrocarbon radical. A more detailed description of suitable metal chelates, as well as their preparation for this purpose, is disclosed in my copending application Serial No. 555,025, filed September 20, 1944, now patent 2,465,296. The combination of the metal chelates will assure a continuity of the organo-polysiloxane film over the polyester amide which will enable the optimum oxidation protection.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. An insulated conductor comprising, in combination, a conductor, a coating of a cured crosslinked polyester-amide resin applied directly upon the conductor and a superposed coating of an organo-polysiloxane resin the cross-linked polyester-amide resin derived by heating (A) a mixture of acidic compounds having an average of from 2 to 3½ non-carboxyl carbon atoms composed of from 48 to 92 mole percent of at least one unsaturated acidic compound selected from the group consisting of maleic acid, maleic anhydride, fumaric acid, citraconic acid and citraconic anhydride, and from 52 to 8 mole percent of saturated dicarboxylic acids having from 4 to 12 carbon atoms in a straight chain with a carboxyl group at each end of the chain, the saturated acids having no other reactive groups than the carboxyl groups, and (B) a mixture of primary hydrocarbon diamines having from 2 to 3 carbon atoms and a polyhydric hydrocarbon alcohol having no other reactive groups than the hydroxyl groups, the total number of moles of diamine and polyhydric alcohol equal to at least the moles of the mixtures of acidic compounds but not exceeding 4/3 the moles thereof.

2. An insulated conductor comprising, in combination, a conductor, a coating of a cured cross-linked polyester-amide resin, a wrapping of glass fibers applied to the coating of polyester-amide resin, and a superposed coating of an organo-polysiloxane resin the cross-linked polyester-amide resin derived by heating (A) a mixture of acidic compounds having an average of from 2 to 3½ non-carboxyl carbon atoms composed of from 48 to 92 mole percent of at least one unsaturated acidic compound selected from the group consisting of maleic acid, maleic anhydride, fumaric acid, citraconic acid and citraconic anhydride, and from 52 to 8 mole percent of saturated dicarboxylic acids having from 4 to 12 carbon atoms in a straight chain with a carboxyl group at each end of the chain, the saturated acids having no other reactive groups than the carboxyl groups, and (B) a mixture of primary hydrocarbon diamines having from 2 to 3 carbon atoms and a polyhydric hydrocarbon alcohol having no other reactive groups than the hydroxyl groups, the total number of moles of diamine and polyhydric alcohol equal to at least the moles of the mixtures of acidic compounds but not exceeding 4/3 the moles thereof.

3. An insulated conductor comprising, in combination, a conductor, a coating of a cured cross-linked polyester-amide resin, a wrapping of glass fibers applied to the coating of polyester-amide resin, a second coating of cured polyester-amide resin applied over the wrapping of glass fibers, and a superposed coating of an organo-polysiloxane resin the cross-linked polyester-amide resin derived by heating (A) a mixture of acidic compounds having an average of from 2 to 3½ non-carboxyl carbon atoms composed of from 48 to 92 mole percent of at least one unsaturated acidic compound selected from the group consisting of maleic acid, maleic anhydride, fumaric acid, citraconic acid and citraconic anhydride, and from 52 to 8 mole percent of saturated dicarboxylic acids having from 4 to 12 carbon atoms in a straight chain with a carboxyl group at each end of the chain, the saturated acids having no other reactive groups than the carboxyl groups, and (B) a mixture of primary hydrocarbon diamines having from 2 to 3 carbon atoms and a polyhydric hydrocarbon alcohol having no other reactive groups than the hydroxyl groups, the total number of moles of diamine and polyhydric alcohol equal to at least the moles of the mixtures of acidic compounds but not exceeding 4/3 the moles thereof.

4. An insulated conductor comprising in combination, a conductor, a coating of a substantially isotropic, cured cross-linked polyester-amide resin applied directly upon the conductor and a superposed coating of an organo-poylsiloxane resin, the polyester-amide resin comprising the resinous reaction product produced by heating from 4.25 to 5.9 moles of an unsaturated acidic compound selected from the group consisting of maleic acid, fumaric acid, maleic anhydride and the monomethyl substitution derivatives for the non-carboxyl hydrogen thereof, from about 1 to 2.4 moles of adipic acid, from about 1 to 2.4 moles of succinic acid, the three acidic ingredients totaling 7.2 to 8.8 moles, 2.1 to 2.65 moles of a primary hydrocarbon diamine having from 2 to 3 carbon atoms, and 5 to 6.75 moles of glycol, the glycol having no other reactive groups than the hydroxyl groups, the total moles of diamine and glycol being substantially equal to at least the moles of the acidic ingredients.

5. An insulated conductor comprising, in combination, a conductor, a coating of a substantially isotropic, cured polyester-amide resin applied directly upon the conductor and a superposed coating of an organo-polysiloxane resin, the polyester-amide resin comprising the resinous reaction product produced by heating from 5 to 5.75 moles of maleic anhydride, from 1.2 to 1.5 moles of succinic acid, from 1.2 to 1.5 moles of adipic acid, the three acidic ingredients totaling substantially 8 moles, from 2.1 to 2.65 moles of ethylene diamine and from 5 to 6.75 moles of ethylene glycol, the ethylene diamine and glycol totaling at least 8 moles.

6. An insulated conductor comprising, in combination, a conductor, a coating of a substantially isotropic, cured polyester-amide resin applied directly upon the conductor and a superposed coating of an organo-polysiloxane resin, the polyester-amide resin comprising the resinous reaction product produced by heating from 3.89 to 4 moles of maleic anhydride, from 1 to 1.11 moles of adipic acid, from 1.166 to 1.1435 moles of glycerol, from 2.438 to 3.25 moles of monoethanolamine and up to 0.406 moles of ethylene diamine.

7. An insulated conductor comprising, in combination, a conductor, a coating of a cured cross-linked polyester-amide resin applied directly upon the conductor, the cross-linked polyester-amide resin derived by heating (A) a mixture of acidic compounds having an average of from 2 to 3½ non-carboxyl carbon atoms composed of from 48 to 92 mole percent of at least one unsaturated acidic compound selected from the group consisting of maleic acid, maleic anhydride, fumaric acid, citraconic acid and citraconic anhydride, and from 52 to 8 mole percent of saturated dicarboxylic acids having from 4 to 12 carbon atoms in a straight chain with a carboxyl group at each end of the chain, the saturated acids having no other reactive groups than the carboxyl groups, and (B) a mixture of primary hydrocarbon diamines having from 2 to 3 carbon atoms and a polyhydric alcohol having no other reactive groups than the hydroxyl groups, the total number of moles of diamine and polyhydric alcohol equal to at least the moles of the mixture of acidic compounds but not exceeding 4/3 the moles thereof, a superposed coating of an organo-polysiloxane resin, and a stabilizer for the organo-polysiloxane resin.

8. An insulated conductor comprising, in combination, a conductor, a coating of a cured cross-linked polyester-amide resin applied directly upon the conductor, the cross-linked polyester-amide resin derived by heating (A) a mixture of acidic compounds having an average of from 2 to 3½ non-carboxyl carbon atoms composed of from 48 to 92 mole percent of at least one unsaturated acidic compound selected from the group consisting of maleic acid, maleic anhydride, fumaric acid, citraconic acid and citraconic anhydride, and from 52 to 8 mole percent of saturated dicarboxylic acids having from 4 to 12 carbon atoms in a straight chain with a carboxyl group at each end of the chain, the saturated acids having no other reactive groups than the carboxyl groups, and (B) a mixture of primary hydrocarbon diamines having from 2 to 3 carbon atoms and a polyhydric alcohol having no other reactive groups than the hydroxyl groups, the total number of moles of diamine and polyhydric alcohol equal to at least the moles of the mixture of acidic compounds but not exceeding 4/3 the moles thereof, a superposed coating of an organo-polysiloxane resin, and a stabilizer for the organo-polysiloxane resin, the stabilizer selected from a metal chelate comprising a metal reacted with a compound of the formula

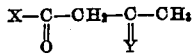

where X represents hydrocarbon, alkoxy, and hydrocarbon substituted amino groups and Y represents oxygen, and hydrocarbon substituted imino groups, the substituted imino radical being present only when X is a hydrocarbon radical.

JACK SWISS.

REFERENCES CITED

The following references are of record in the file of this patent:

UNITED STATES PATENTS

| Number | Name | Date |
|---|---|---|
| 2,048,778 | Brubaker et al. | July 28, 1936 |
| 2,258,218 | Rochow | Oct. 7, 1941 |
| 2,307,075 | Quattlebaum | Jan. 5, 1943 |
| 2,333,922 | Foster | Nov. 9, 1943 |
| 2,349,952 | Fuller | May 30, 1944 |
| 2,370,046 | Keyes | Feb. 20, 1945 |
| 2,424,884 | Cooke et al. | July 29, 1947 |